(12) United States Patent
Murakami et al.

(10) Patent No.: US 8,110,957 B2
(45) Date of Patent: Feb. 7, 2012

(54) PERMANENT MAGNET MOTOR

(75) Inventors: Masanori Murakami, Kawasaki (JP); Chanaporn Thanathihipong, Kawasaki (JP); Wijittra Jabtanom, Kawasaki (JP); Pairoj Patisonticharoen, Kawasaki (JP)

(73) Assignee: Fujitsu General Limited, Kanagawa-Ken (JP)

( * ) Notice: Subject to any disclaimer, the term of this patent is extended or adjusted under 35 U.S.C. 154(b) by 270 days.

(21) Appl. No.: 12/654,719

(22) Filed: Dec. 30, 2009

(65) Prior Publication Data

US 2010/0176680 A1 Jul. 15, 2010

(30) Foreign Application Priority Data

Jan. 15, 2009 (JP) .................................. 2009-006316

(51) Int. Cl.
*H02K 21/12* (2006.01)
(52) U.S. Cl. ............................... 310/156.38; 310/156.45
(58) Field of Classification Search . 310/156.38–156.46
See application file for complete search history.

(56) References Cited

U.S. PATENT DOCUMENTS

| 6,784,582 | B1* | 8/2004 | Kolomeitsev et al. | ... 310/156.38 |
| 6,812,614 | B2* | 11/2004 | Yamamoto et al. | ........ 310/261.1 |
| 7,183,684 | B2* | 2/2007 | Miyashita et al. | ....... 310/156.38 |
| 7,898,137 | B2* | 3/2011 | Miyata | ..................... 310/156.38 |
| 2005/0258698 | A1* | 11/2005 | Miyashita et al. | ....... 310/156.38 |
| 2006/0131976 | A1* | 6/2006 | Kikuchi et al. | .......... 310/156.46 |
| 2009/0015090 | A1* | 1/2009 | Kimura et al. | ........... 310/156.08 |
| 2009/0251023 | A1* | 10/2009 | Nakano et al. | ........... 310/156.38 |

* cited by examiner

*Primary Examiner* — Thanh Lam
(74) *Attorney, Agent, or Firm* — Manabu Kanesaka

(57) ABSTRACT

There is provided a permanent magnet motor capable of reducing cogging torque and torque ripple while suppressing a decrease in motor output. In a permanent magnet motor 1 including a rotor 3 in which a plurality of permanent magnets 5 are arranged in a ring shape as a magnetic field unit, the transverse cross section of the permanent magnet 5 has an inside periphery 51 formed by a first arc 511 having the center of curvature O1 and the radius of curvature R1, and an outside periphery 52 formed by a second arc 521 having the center of curvature O2 and the radius of curvature R2, a third arc 522 having the center of curvature O3 and the radius of curvature R3 and joined to one end of the second arc 521, and a fourth arc 523 having the center of curvature O4 and the radius of curvature R4 and joined to the other end of the second arc 521. The above-described centers of curvature are disposed at different positions.

3 Claims, 3 Drawing Sheets

Fig. 3
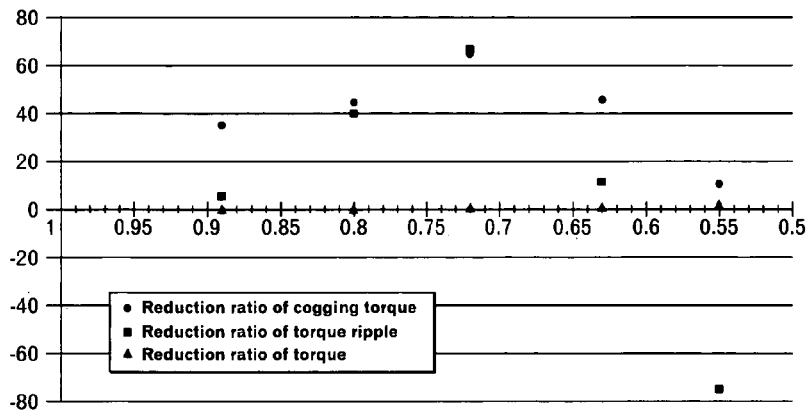
Fig. 4
| R2 / A01 | 0.89 | 0.80 | 0.72 | 0.63 | 0.55 |
|---|---|---|---|---|---|
| R3 / R2 | 0.49 | 0.56 | 0.66 | 0.81 | 0.96 |
| Reduction ratio of cogging torque | 34% | 47% | 65% | 45% | 12% |
| Reduction ratio of torque ripple | 7% | 40% | 67% | 12% | -75% |
| Reduction ratio of torque | 0% | 0% | 1% | 2% | 3% |
Fig. 5
RELATED ART
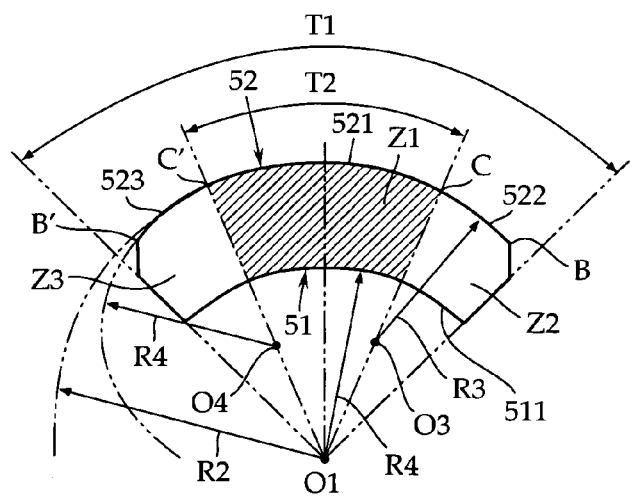

PERMANENT MAGNET MOTOR

CROSS-REFERENCE TO RELATED APPLICATIONS

The present application is based on, and claims priority from, Japanese Application Serial Number JP2009-006316, filed Jan. 15, 2009, the disclosure of which is hereby incorporated by reference herein in its entirety.

TECHNICAL FIELD

The present invention relates to a permanent magnet motor for driving a blower fan for a room air conditioner, a hot-water heater, and the like. More particularly, it relates to a permanent magnet motor capable of reducing cogging torque and torque ripple and capable of suppressing a decrease in motor torque.

BACKGROUND ART

Conventionally, there has been known a permanent magnet motor including a shaft, a rotor provided with a rotor core fixed to the shaft and a plurality of permanent magnets serving as magnetic field means arranged at equal intervals in a ring shape on the outside peripheral surface of the rotor core, and a stator having a coil wound on a stator core.

It has been known that cogging torque (a change in torque, which is produced by a magnetic attraction force generated between the stator and the rotor, with respect to the rotation angle) and torque ripple (torque pulsation), both commonly found in the permanent magnet motor, depend on the air-gap magnetic flux density distribution generated between the permanent magnet constituting the rotor and the stator core constituting the stator. The cogging torque and the torque ripple are problematic because they may cause vibrations and a noise in the motor.

As means for solving those problems, there has been known a permanent magnet motor that reduces cogging torque by means of a permanent magnet 5 shown in FIG. 5 (see Patent Document 1: Japanese Patent Application Publication No. 2002-84695). FIG. 5 is a cross-sectional view of the permanent magnet 5 used for the permanent magnet motor described in Patent Document 1. As shown in FIG. 5, for the permanent magnet 5, an inside periphery 51 thereof is formed by a first arc 511, and an outside periphery 52 thereof is formed by a second arc 521, a third arc 522 joining to one end C of the second arc 521, and a fourth arc 523 joining to the other end C' of the second arc 521.

In the case of a permanent magnet motor (not shown) using this permanent magnet 5, since the second arc 521 is formed by an arc having a center O1 that is the same as the center of the first arc 511, the thickness in the radial direction of the permanent magnet 5 can be made fixed in a zone Z1 (hatched portion) defined by the first arc 511 and the second arc 521, so that the decrease in motor output can be suppressed. On the other hand, in a zone Z2 defined by the first arc 511 and the third arc 522 and a zone Z3 defined by the first arc 511 and the fourth arc 523, the thickness in the radial direction decreases toward the end part, so that cogging torque can be reduced to some degree.

However, in the permanent magnet 5, although the thickness in the radial direction of the permanent magnet 5 is fixed in the zone 1, the thickness in the radial direction in the zones Z2 and Z3 decreases abruptly toward opposite ends B, B' on the outside periphery 52, so that cogging torque and torque ripple cannot be reduced sufficiently.

SUMMARY OF THE INVENTION

The present invention has been made to solve the above problems with the conventional art, and accordingly an object thereof is to provide a permanent magnet motor capable of reducing cogging torque and torque ripple while suppressing a decrease in motor torque.

To achieve the above object, the present invention provides a permanent magnet motor including a stator having a stator core and a coil wound on the stator core; and a rotor having a plurality of permanent magnets arranged in a ring shape, the stator core having a ring-shaped yoke part and teeth parts extending radially from the yoke part, wherein the transverse cross section of the permanent magnet has an inside periphery consisting of a first arc having the center of curvature O1 and the radius of curvature R1, and an outside periphery consisting of a second arc having the center of curvature O2 and the radius of curvature R2, a third arc having the center of curvature O3 and the radius of curvature R3 and joined to one end of the second arc, and a fourth arc having the center of curvature O4 and the radius of curvature R4 and joined to the other end of the second arc; when the middle point of the second arc is A, one end thereof is C, and the other end is C', the center of curvature O2 is disposed on a line segment AO1 where the line segment AO1 is a line segment connecting the center of curvature O1 to the middle point A, the center of curvature O3 is disposed on a line segment CO2 where the line segment CO2 is a line segment connecting the center of curvature O2 to the one end C of the second arc, and the center of curvature O4 is disposed on a line segment C'O2 where the line segment C'O2 is a line segment connecting the center of curvature O2 to the other end C' of the second arc; and the radii of curvature R2, R3 and R4 and the length of the line segment AO1 satisfy Formula 1:

$$AO1 > R2 > R3 = R4. \quad \text{(Formula 1)}$$

In a preferred embodiment, the ratio of the radius of curvature R2 to the length of the line segment AO1 satisfies Formula 2:

$$0.63 \leq (R2/AO1) \leq 0.8. \quad \text{(Formula 2)}$$

In a further preferred embodiment, the ratio of the radius of curvature R3 to the radius of curvature R2 satisfies Formula 3:

$$0.56 \leq (R3/R2) \leq 0.81. \quad \text{(Formula 3)}$$

According to the present invention, cogging torque and torque ripple can be reduced while a decrease in motor torque is suppressed.

BRIEF DESCRIPTION OF THE DRAWINGS

FIG. 3 is a graph showing the relationship between the reduction ratios of cogging torque and torque ripple and the radius of curvature R2;

FIG. 4 is a table showing the relationship between the reduction ratios of cogging torque and torque ripple and the radii of curvature R2 and R3; and FIG. 5 is a cross-sectional view of a conventional permanent magnet.

DETAILED DESCRIPTION

Figure 1:
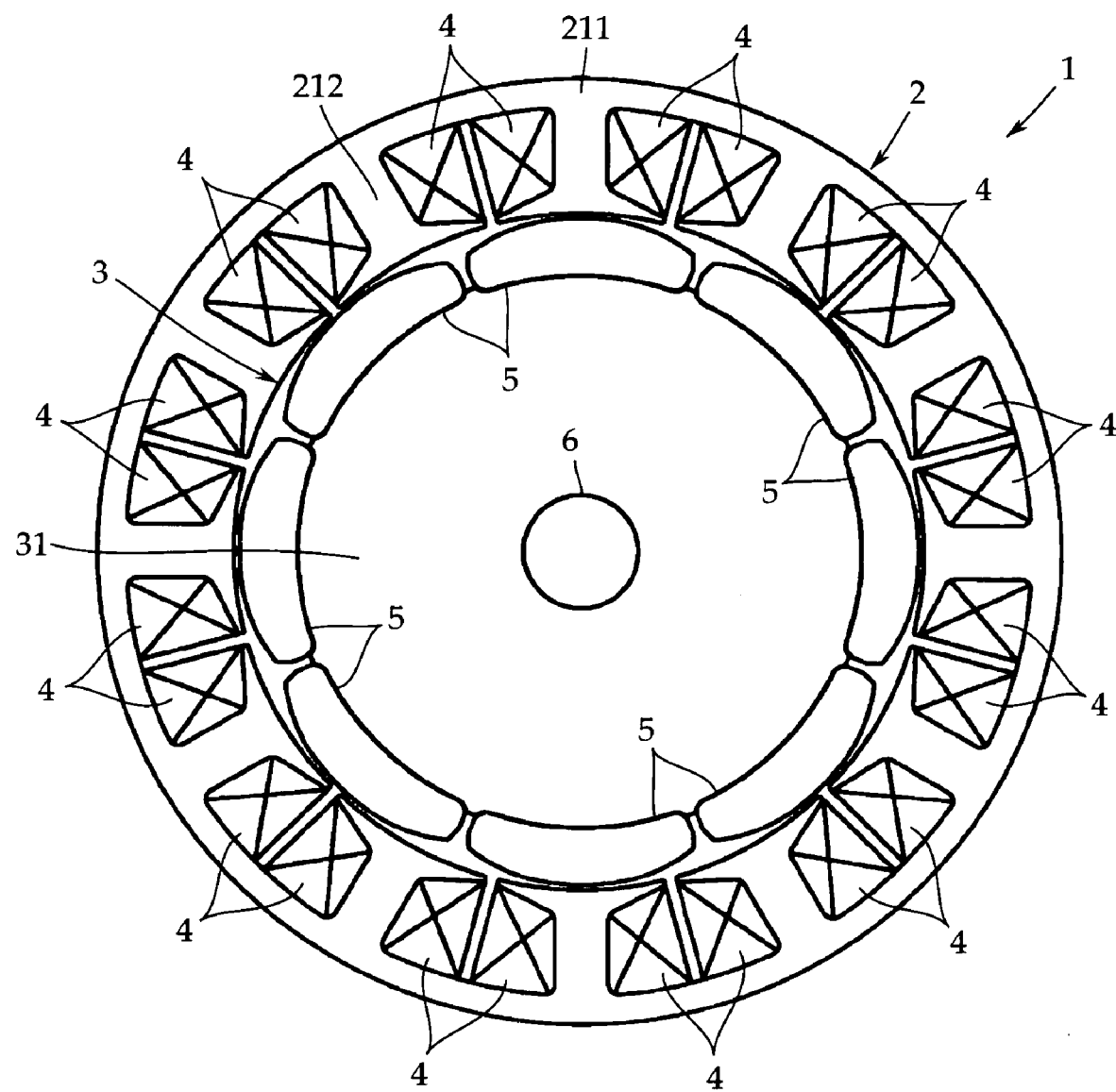
FIG. 1 is a cross-sectional view of a permanent magnet motor in accordance with the present invention.

An embodiment of the present invention will now be described with reference to the accompanying drawings. FIG. 1 is a cross-sectional view of a permanent magnet motor in accordance with the present invention.

As shown in FIG. 1, a permanent magnet motor 1 in accordance with the present invention includes a ring-shaped stator 2 and a rotor 3 positioned along an inside periphery of the stator 2 coaxially and provided with a shaft 6 in the center of the rotor 3 coaxially. The rotor 3 provided with a rotor core 31 fixed to the shaft 6 and eight permanent magnets 5 serving as magnetic field means arranged at equal intervals in a ring shape on the outside peripheral surface of the rotor core 31. The stator 2 surrounds the rotor 3 via a predetermined gap inbetween and has a ring-shaped yoke part 211 and teeth parts 212 extending radially from the yoke part 211. A coil 4 is wound on a stator core 21.

Figure 2:
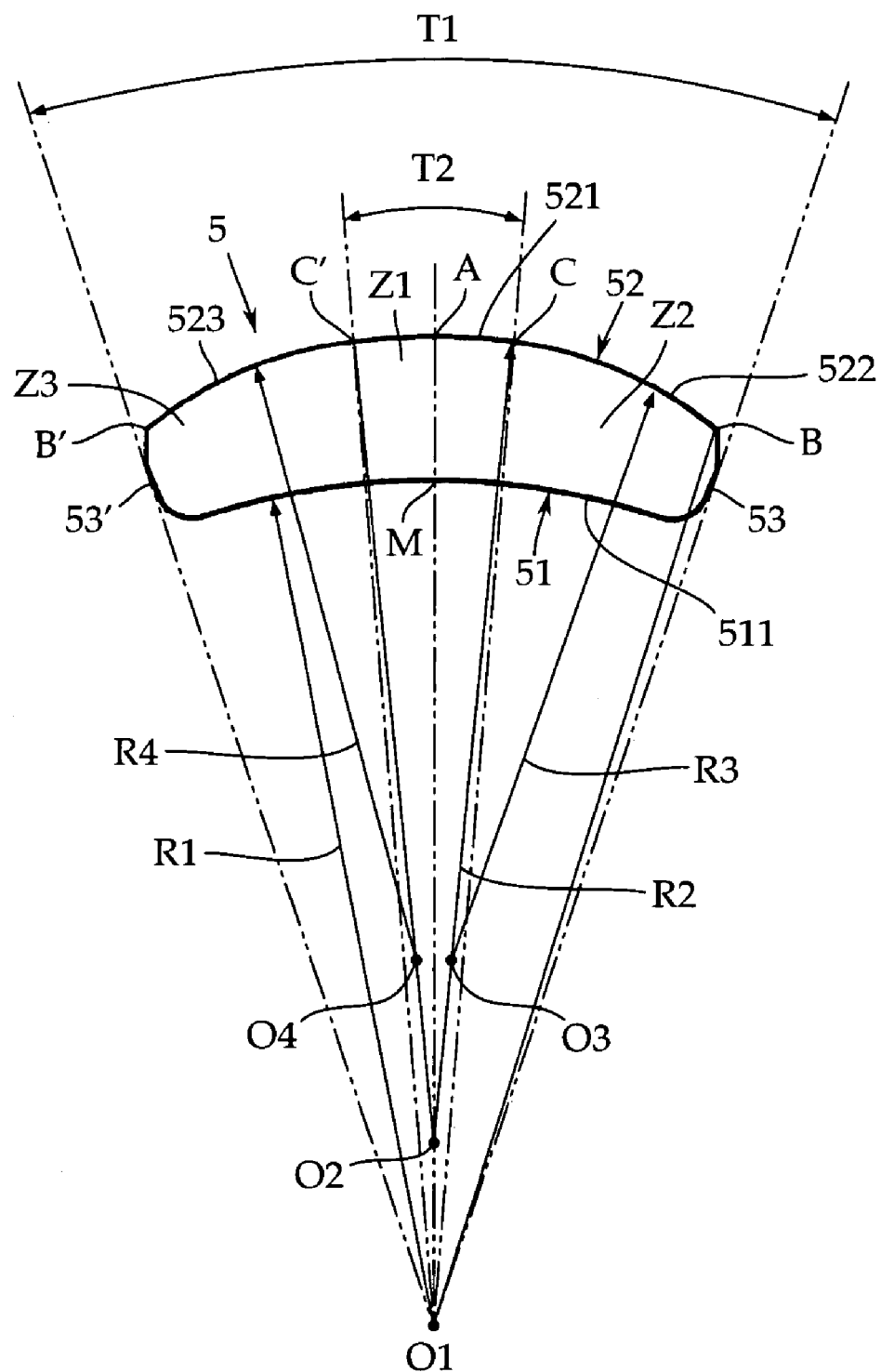
FIG. 2 is a cross-sectional view of a permanent magnet in accordance with the present invention.

FIG. 2 is a cross-sectional view illustrating the permanent magnets 5 shown in FIG. 1 in detail. Since every permanent magnet 5 has the same shape, the description will be made below with reference to only one of the magnets. The permanent magnet 5 has, like a conventional permanent magnet 5 shown in FIG. 5, an inside periphery 51, an outside periphery 52, and a pair of side peripheries 53 and 53' each connecting the inside periphery 51 to the outside periphery 52. The inside periphery 51 is formed by a first arc 511 having the center of curvature O1 and the radius of curvature R1. On the other hand, the outside periphery 52 is formed by a second arc 521 having the center of curvature O2 different from the center of curvature O1 of the first arc and the radius of curvature R2, a third arc 522 having the center of curvature O3 and the radius of curvature R3 and joined to one end C of the second arc 521, and a fourth arc 523 having the center of curvature O4 and the radius of curvature R4 and joined to the other end C' of the second arc 521.

When the middle point of the first arc 511 is M, and the middle point of the second arc 521 is A, as shown in FIG. 2, the centers of curvature O1 and O2 and the middle points M and A are arranged in a straight line on a line segment AO1 connecting the middle point A to the center of curvature O1. The radius of curvature R2 of the second arc 521 has a length shorter than the line segment AO1. Also, the center of curvature O3 of the third arc 522 lies on a line segment CO2 connecting the one end C of the second arc 521 to the center of curvature O2, so that the boundary between the second arc 521 and the third arc 522 is not angular, and the smooth outside periphery 52 changing continuously is formed. Also, the radius of the curvature R3 of the third arc 522 is shorter than the radius of curvature R2 of the second arc 521.

Similarly, the center of curvature O4 of the fourth arc 523 lies on a line segment C'O2 connecting the other end C' of the second arc 521 to the center of curvature O2, so that the boundary between the second arc 521 and the fourth arc 523 is not angular, and the smooth outside periphery 52 changing continuously is formed. Also, the radius of the curvature R4 of the fourth arc 523 is shorter than the radius of curvature R2 of the second arc 521.

The transverse cross section of the permanent magnet 5 of the present invention has a shape symmetrical with respect to the line segment AO1 as shown in FIG. 2. Therefore, the radius of curvature R3 of the third arc 523 is equal to the radius of curvature R4 of the fourth arc 524.

As described above, the permanent magnet 5 of the present invention is configured so that the center of curvature O2 of the second arc 521 lies on the line segment AO1, so that the radius of curvature R2 of the second arc 521 is shorter than the length of the line segment AO1. Therefore, in a zone Z1 defined by the first arc 511 and the second arc 521, the thickness in the radial direction of the permanent magnet 5 is the largest at the middle point A of the second arc 521, and decreases gradually toward the one end C (or the other end C') of the second arc 521.

In a zone Z2 defined by the first arc 511 and the third arc 522 and in a zone Z3 defined by the first arc 511 and the fourth arc 523 as well, since both the radius of curvature R3 and the radius of curvature R4 are smaller than the radius of curvature R2, the thickness in the radial direction of the permanent magnet 5 of the present invention further decreases toward one end B and the other end B' of the outside periphery even in the zones Z2 and Z3 following the zone Z1.

Thus, the thickness in the radial direction of the permanent magnet 5 of the present invention decreases gradually even in the zones Z2 and Z3 following the zone Z1, so that cogging torque and torque ripple can be reduced.

The degrees of reductions in torque, cogging torque, and torque ripple of the permanent magnet motor 1 at the time when the radius of curvature R2 of the second arc 521 is decreased while the length of the line segment AO1 is fixed in the permanent magnet 5 of the present invention shown in FIG. 1 were calculated by magnetic field analysis. The calculation results are shown in the graph of FIG. 3. The objects of comparison are the torque, cogging torque, and torque ripple of the permanent magnet motor 1 using the conventional permanent magnet 5 shown in FIG. 5.

In this analysis, when the radius of curvature R2 of the second arc 521 was decreased, the kind and orientation of the permanent magnet 5 of the present invention, the positions of the middle point A of the second arc 521 and both ends B and B' of the outside periphery, the magnitude of a central angle T1, and the magnitude of an angle T2 that the ends C and C' of the second arc 521 make with respect to O1 were made unchanged. Therefore, if the radius of curvature R2 is determined, the positions of the centers of curvature O3 and O4 and the radii of curvature R3 and R4 of the third arc 522 and the fourth arc 523, respectively, are determined accordingly. Specifically, the position of the center of curvature O3 is made a position on the line segment CO2 connecting the center of curvature O3 to the one end C of the second arc 521 at which the length from the center of curvature O3 to the one end C of the second arc 521 is equal to the length from the center of curvature O3 to the one end B of the outside periphery. The same holds true for the center of curvature O4 and the radius of curvature R4 of the fourth arc 523.

The ratio of the radius of curvature R3 of the third arc 522 to the radius of curvature R2 of the second arc 521 (R3/R2), the reduction ratios of the cogging torque and torque ripple of the permanent magnet motor 1, and the reduction ratio of the torque thereof at the time when the radius of curvature R2 of the second arc 521 is decreased in the permanent magnet 5 of the present invention shown in FIG. 1 were calculated by magnetic field analysis. The calculation results are shown in the table of FIG. 4. The objects of comparison are the torque, cogging torque, and torque ripple of the permanent magnet motor 1 using the conventional permanent magnet 5 shown in FIG. 5.

In the above-described magnetic field analysis, the permanent magnet 5 of the present invention was ferrite sintered so that the magnetizing direction thereof was parallel orientation, the radius of curvature R1 of the first arc 511 was 29.25 mm, the length of the line segment AO1 was 35.25 mm, the length of the line segment BO1 was 33.49 mm, the central angle T1 of the permanent magnet 5 was 43 degrees (machine angle), the angle T2 was 10.75 degrees (machine angle), and the minimum length of an air gap with respect to the stator core 30 was 0.5 mm.

As can be seen from FIG. 3, the reduction ratio of torque is tend to increase as the difference increases between the length of the line segment AO1 and the radius of curvature R2. Specifically, if the ratio of the radius of curvature R2 to the length of the line segment AO1 (R2/AO1) is 0.8 or greater, the torque does not decrease. When the radius of curvature R2 is decreased further, and the ratio is 0.72, the torque decreases by 1%, when it is 0.63, the torque decreases by 2%, and when the ratio is 0.55, the torque decreases by 3%. The reason for this is that as the radius of curvature R2 decreases, the thickness in the radial direction of the permanent magnet 5 decreases, so that the torque decreases.

As can be seen from FIG. 4, within a certain range, as the ratio of the radius of curvature R3 to the radius of curvature R2 (R3/R2) increases, the reduction ratios of cogging torque and torque ripple increase. As also can be seen, especially while the ratio of the radius of curvature R3 to the radius of curvature R2 (R3/R2) is under 0.56, cogging torque and torque ripple decrease by 40% or more at a maximum although the torque scarcely decreases. When the ratio of the radius of curvature R3 to the radius of curvature R2 (R3/R2) is 0.66, the torque decreases by 1%, but the reduction ratios of both of cogging torque and torque ripple each exhibit the maximum value of 60% or more.

The increase in the ratio of the radius of curvature R3 to the radius of curvature R2 (R3/R2) means that the radius of curvature R2 decreases, whereas the radius of curvature R3 increases. When the radius of curvature R2 decreases, the difference between the length of the line segment AO1 and the radius of curvature R2 increases, and the reduction ratio of the thickness of the permanent magnet 5 increases toward both ends (both the ends C and C' of the second arc 521) of the zone Z1. On the other hand, when the radius of curvature R3 increases, the reduction ratio of the thickness of the permanent magnet 5 decreases toward one end (the one end B of the outside periphery 52) of the zone Z2. Thus, the reduction ratio of the thickness of the permanent magnet 5 in the zone Z1 increases, and on the other hand, the reduction ratio of the thickness of the permanent magnet 5 in the zone Z2 decreases. Therefore, the waveform of the surface magnetic flux of the permanent magnet 5 approaches a sinusoidal waveform, and cogging torque and torque ripple are reduced as compared with the conventional permanent magnet 5 shown in FIG. 5.

However, if the ratio R3/R2 increases, exceeding 0.66, and reaches 0.81, the cogging torque and torque ripple increase, and the reduction ratios of cogging torque and torque ripple in the case of comparing with the conventional permanent magnet 5 shown in FIG. 5 decrease. The reason for this is that if the ratio of the radius of curvature R3 to the radius of curvature R2 (R3/R2) exceeds 0.66 and approaches 1.0, the shape of outside periphery 52 approaches a shape formed by a single arc, and the waveform of the surface magnetic flux of the permanent magnet 5 of the present invention goes away from the sinusoidal waveform.

As described above, in the case where the radius of curvature R2 decreases so that the ratio of the radius of curvature R2 to the length of the line segment AO1 (R2/AO1) is made not lower than 0.63 and not higher than 0.8, and the ratio of the radius of curvature R3 to the radius of curvature R2 (R3/R2) is made not lower than 0.56 and not higher than 0.81, the cogging torque can be reduced by 40% or more at a maximum while the torque is scarcely decreased. If the ratios (R2/AO1) and (R3/R2) are within the above ranges, a permanent magnet motor in which noise and efficiency are in good balance can be obtained.

The permanent magnet motor 1 of the present invention is configured so that the central angle T1 of the permanent magnet 5 is approximately 43 degrees, and eight permanent magnets 5 are arranged at equal intervals in a ring shape to form the rotor. However, the present invention is not limited to this configuration. For example, six or ten permanent magnets can be arranged at equal intervals in a ring shape to form the rotor according to the central angle T1 of the permanent magnet. Also, other configurations (for example, the number of slots) can also be changed as appropriate.

The invention claimed is:

1. A permanent magnet motor comprising:
   a stator having a stator core and a coil wound on the stator core; and
   a rotor having a plurality of permanent magnets arranged in a ring shape,
   the stator core having a ring-shaped yoke part and teeth parts extending radially from the yoke part, wherein
   the transverse cross section of the permanent magnet has an inside periphery consisting of a first arc having the center of curvature O1 and the radius of curvature R1, and an outside periphery consisting of a second arc having the center of curvature O2 and the radius of curvature R2, a third arc having the center of curvature O3 and the radius of curvature R3 and joined to one end of the second arc, and a fourth arc having the center of curvature O4 and the radius of curvature R4 and joined to the other end of the second arc;
   when the middle point of the second arc is A, one end thereof is C, and the other end is C', the center of curvature O2 is disposed on a line segment AO1 where the line segment AO1 is a line segment connecting the center of curvature O1 to the middle point A, the center of curvature O3 is disposed on a line segment CO2 where the line segment CO2 is a line segment connecting the center of curvature O2 to the one end C of the second arc, and the center of curvature O4 is disposed on a line segment C'O2 where the line segment C'O2 is a line segment connecting the center of curvature O2 to the other end C' of the second arc; and
   the radii of curvature R2, R3 and R4 and the length of the line segment AO1 satisfy Formula 1:

$$AO1 > R2 > R3 = R4. \qquad \text{(Formula 1)}.$$

2. The permanent magnet motor according to claim 1, wherein
   the ratio of the radius of curvature R2 to the length of the line segment AO1 satisfies Formula 2:

$$0.63 \leq (R2/AO1) \leq 0.8. \qquad \text{(Formula 2)}.$$

3. The permanent magnet motor according to claim 2, wherein
   the ratio of the radius of curvature R3 to the radius of curvature R2 satisfies Formula 3:

$$0.56 \leq (R3/R2) \leq 0.81. \qquad \text{(Formula 3)}.$$

* * * * *